May 12, 1931.  T. LORD ET AL  1,804,796
MACHINE FOR MAKING BLUE PRINTS AND OTHER PHOTOPRINTS
Filed Feb. 18, 1928  2 Sheets-Sheet 1

Witness:
Chas. P. Koursh.

Inventors,
Thomas Lord,
and Harold J. Bruck,

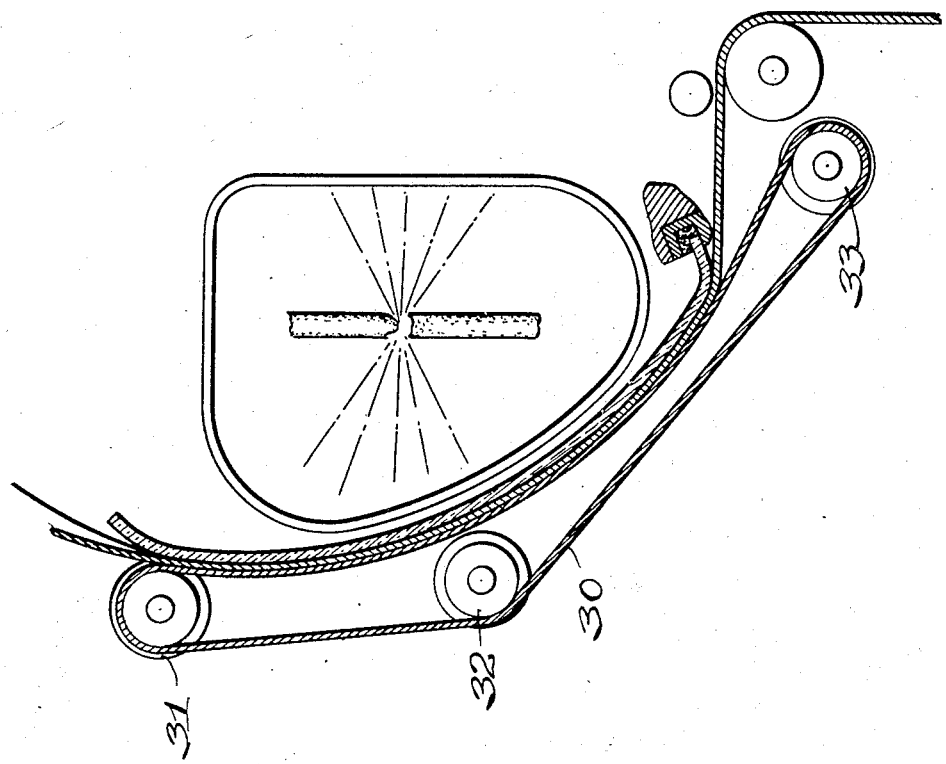
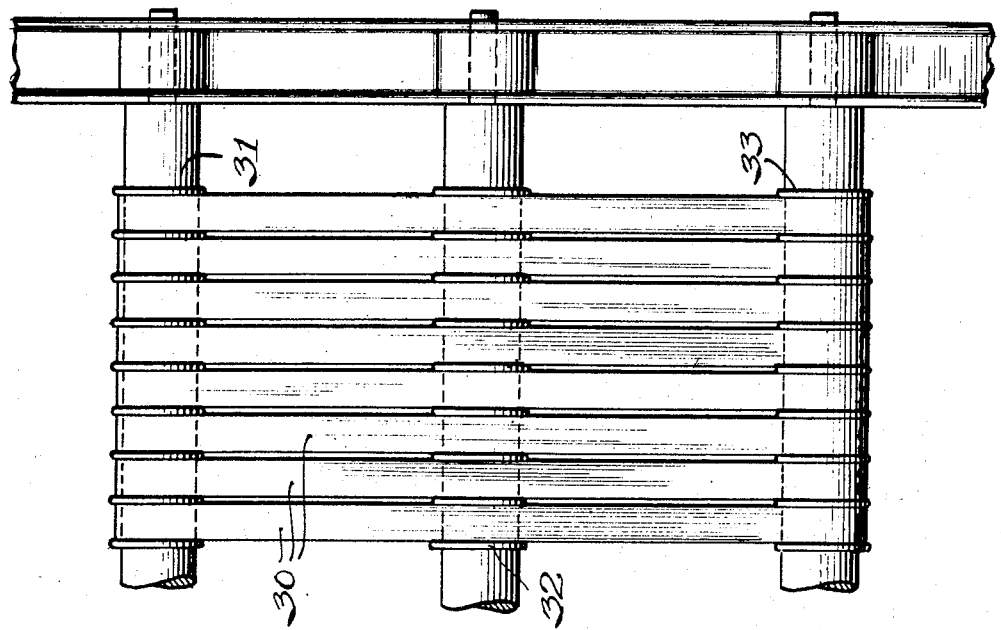

Patented May 12, 1931

1,804,796

UNITED STATES PATENT OFFICE

THOMAS LORD AND HAROLD J. BRUNK, OF CHICAGO, ILLINOIS, ASSIGNORS TO C. F. PEASE COMPANY, OF CHICAGO, ILLINOIS, A CORPORATION OF DELAWARE

MACHINE FOR MAKING BLUE PRINTS AND OTHER PHOTOPRINTS

Application filed February 18, 1928. Serial No. 255,459.

This invention relates to improvements in machines for making blue prints and other photoprints.

In such machines the printing is done by a row of arc lights and the sensitized paper and negatives are carried past said arc lights by an endless belt which slides over a curved sheet of glass, the latter serving to hold the negatives and sensitized paper at a definite predetermined distance from the arc lights as they are being slowly dragged over the outer surface of the glass.

The glass is preferably curved so that the prints maintain a more uniform distance from the source of light for an appreciable interval of time. While a comparatively smooth curved surface is desired, it is very difficult, in the practical manufacture of curved glass, to attain such a surface, and slight irregularities, in the form of recesses or projections are frequently found. Under these conditions the sensitized paper is not held firmly against the negative or tracing at all times, with the result that some of the lines on the finished print may either be completely broken or present a blurred appearance. This objectionable condition is augmented by the fact that the fabric belt itself often presents slight irregularities in structure and develops local weaknesses, as the result of which perfect contact over the glass is not always maintained.

The object of our invention is to provide means for holding the sensitized paper firmly against the negatives throughout the entire surface of the latter thereby insuring a complete reproduction of the tracing with lines which are well defined and sharp.

In the accompanying drawings we have illustrated two embodiments of our invention.

Fig. 2 is a similar partial elevation of a modification, and

Fig. 3 is a rear view thereof.

Figure 1:
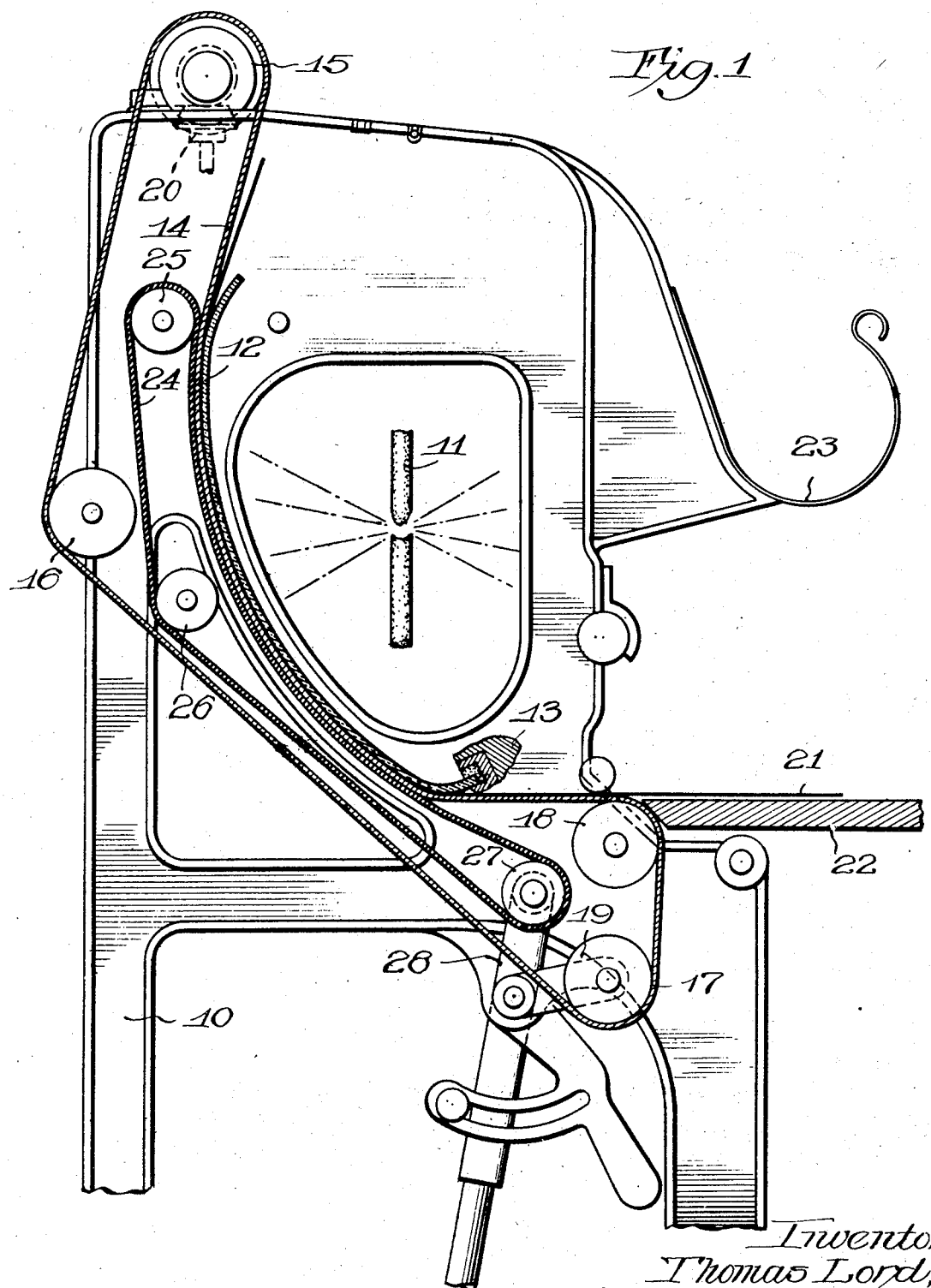
Fig. 1 is a side elevation of a commercial machine.

The mechanism shown on the drawings comprises only a part of a complete commercial machine for printing, washing and drying blue prints or other photoprints. The parts of the equipment immediately concerned with the present invention are supported on a pair of side frames 10. The position of the row of arc lights is indicated diagrammatically at 11. A curved sheet of glass 12 is mounted adjacent said arc lights as shown, the lower end being mounted in a supporting clamp 13 shown only in part. A canvas belt 14 is arranged to slide over the curved glass from bottom to top, being supported on rollers 15, 16, 17 and 18. The roller 17 is mounted on a pivoted arm 19 whereby the tension of the belt may be suitably adjusted. The roller 15 is driven by bevelled gears 20 and thus imparts the necessary slow movement to the belt.

The sensitized paper 21 is usually in the form of a large roll several feet wide which is fed through the machine, passing over a supporting table 22, and being carried by the belt 14 by friction over the outer curved surface of the glass 12, and thence to the washing and drying apparatus, not shown. The negatives are laid on the sensitized paper as it slides over the table 22, and are thus dragged over the surface of the glass by the sensitized paper, the negatives being slowly discharged at the top over a suitable support which terminates in a sheet metal receptacle 23, from which they may be removed as they collect.

The means for holding the canvas or fabric belt against the glass will now be described. In Fig. 1 it consists of a wide belt 24 of elastic material, preferably rubber, or rubberized fabric and substantially as wide as the canvas belt 14, said rubber belt passing over rollers 25, 26 and 27. These rollers are all idlers, the movement of the rubber belt being caused by frictional engagement with the canvas belt. The roller 27 is mounted on a pivoted arm 28, whereby its tension may be adjusted to suit different conditions. This belt is kept under considerable tension which stretches the soft rubber and forces it firmly in contact with the canvas belt, the latter in turn pressing the sensitized paper against the negatives and insuring well defined prints.

In Figs. 2 and 3 the rubber belt instead of being mounted as a single wide belt, is in the form of a series of narrow belts or rubber tapes 30 passing over a series of pulleys 31, 32 and 33 in much the same manner and for the same purpose as in the previously described mechanism. As these belts are separated merely by thin flanges, they present almost a continuous surface, and can have no possible side movement, whereas in the case of a wide belt travelling over cylindrical rollers there is often a tendency to travel from one side to the other which may require correction. The narrow individual belts also facilitate the exertion of a sufficient pressure against all parts of the adjacent canvas belt to insure intimate contact between the sensitized paper and the negatives, even with very extreme irregularities in the surface of the glass, although under ordinary conditions such irregularities as do occur are amply compensated for by the wide belt.

Machines of the general character described herein may be used for making blueprints, white-prints, and brown-prints, all of such machines being known commercially as blue-print machines. Therefore in the accompanying claims we do not intend to be limited to the particular type of photographic print passing through the machine.

What we claim is:

1. A blue-print machine comprising a source of light, a transparent member, a belt having means to cause it to slide over the surface of said transparent member remote from said light source and carry with it the sensitized paper and negative and a resilient belt movable with and held against the outside of said first belt and mounted under tension to hold said paper and negative in intimate contact.

2. A blue-print machine comprising a row of arc lights, a curved sheet of glass adjacent thereto, an endless fabric belt, rollers supporting said belt in contact with the outer surface of said glass, means for rotating said rollers to cause said belt to slide over said glass and a second endless belt movable with said first belt and also supported on rollers whereby it may press said first belt against said glass.

3. A printing machine comprising a series of arc lights, a curved sheet of glass adjacent thereto over which the sensitized paper and negatives may slide, an endless fabric belt arranged to draw said paper and negatives over said glass and an endless rubber belt arranged to press said fabric belt, sensitized paper and negatives against said glass, said rubber belt being caused to travel by frictional contact with said fabric belt.

4. In combination a series of arc lamps in a horizontal row, a sheet of glass curving rearwardly and upwardly from a point below said arc lamps to a point above the same, a driving roller above said glass, an idler roller in front of the lower edge of said glass, additional idler rollers one of which is adjustable, a fabric belt passing over said rollers and maintained under tension by said adjustable roller and caused by said driving roller to slide rearwardly and upwardly over the outer surface of said glass, additional idler rollers arranged in the space between the oppositely arranged moving spans of said belt and a rubber belt mounted on said additional rollers one of which is adjustable, said rubber belt being held against said upwardly moving span to press said span against said glass and cause it to conform to irregularities in the surface thereof.

5. In combination a series of arc lamps in a horizontal row, a sheet of glass curving rearwardly and upwardly from a point below said arc lamps to a point above the same, a driving roller above said glass, an idler roller in front of the lower edge of said glass, additional idler rollers one of which is adjustable, a fabric belt passing over said rollers and maintained under tension by said adjustable roller and caused by said driving roller to slide rearwardly and upwardly over the outer surface of said glass, additional flanged rollers arranged in the space between the oppositely moving spans of said belt and a series of resilient straps mounted on said flanged rollers in close proximity, to form a belt having a width substantially equal to said fabric belt and held against the upwardly moving span of said fabric belt to press the latter against said glass.

In testimony whereof, we have subscribed our names.

THOMAS LORD.
HAROLD J. BRUNK.